United States Patent [19]

Matsunaga et al.

[11] Patent Number: 4,784,896

[45] Date of Patent: Nov. 15, 1988

[54] HEAT TRANSFER RECORDING SHEET

[75] Inventors: Teruo Matsunaga; Kazunobu Natori, both of Sagamihara; Tamaki Kanai, Machida, all of Japan

[73] Assignee: Teijin Limited, Osaka, Japan

[21] Appl. No.: 921,057

[22] Filed: Oct. 21, 1986

[30] Foreign Application Priority Data

Oct. 25, 1985 [JP] Japan ................................ 60-237623
Oct. 30, 1985 [JP] Japan ................................ 60-241717

[51] Int. Cl.[4] ........................ B32B 27/06; B41M 5/26

[52] U.S. Cl. ................................ 428/215; 346/135.1; 428/195; 428/332; 428/334; 428/335; 428/336; 428/412; 428/475.8; 428/476.3; 428/483; 428/500; 428/520; 428/913; 428/914

[58] Field of Search ...................... 346/135.1; 428/195, 428/500, 913, 914, 213, 215, 216, 332, 334–336, 412, 475.8, 476.3, 483, 520

[56] References Cited

U.S. PATENT DOCUMENTS 4,150,387 4/1979 Miyakawa et al. .............. 346/135.1
4,199,413 4/1980 Miyakawa et al. .............. 346/135.1
4,214,031 7/1980 Miyakawa et al. ................... 427/58

FOREIGN PATENT DOCUMENTS 1116581 6/1986 Japan .................................. 428/195

*Primary Examiner*—John E. Kittle
*Assistant Examiner*—P. R. Schwartz
*Attorney, Agent, or Firm*—Sherman and Shalloway

[57] ABSTRACT

A heat transfer recording sheet comprising (A) a substrate film, and (B) formed on at least one surface of the substrate film, a film of an acrylic resin having recurring units represented by the following formula (1)

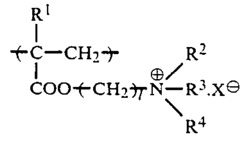

(1)

wherein $R^1$ represents a hydrogen atom or a methyl group, $R^2$ represents a hydrogen atom or an alkyl group having 1 to 5 carbon atoms, $R^3$ and $R^4$ are identical or different and each represents an alkyl or hydroxyalkyl group having 1 to 5 carbon atoms, X represents a halogen atom, and l is 2, 3 or 4.

15 Claims, No Drawings

HEAT TRANSFER RECORDING SHEET

This invention relates to a heat transfer recording sheet. More specifically, it relates to a sheet which is used in a heat transfer recording method comprising heating an ink layer of a transfer medium by a heating means and transferring the ink to the recording sheet, and on which a high quality recording of a signal such as an image can be made.

In recent years, heat transfer recording has been used in recorders and printers of facsimiles, computer terminals, etc. because of its useful characteristics such as non-impact, no noises, freedom from maintenance, low cost, ability to produce colored records, and adaptability to small-sized light-weight devices.

According to the heat transfer recording method, that part of an ink layer on the surface of a transfer medium which corresponds to a recording signal is melted to a flowable state by heating, and then adhered to a recording sheet. Most of heat-meltable inks used in heat transfer recording comprise waxes such as paraffin wax, oxidized waxes and carnauba wax as a main component. Hence, in performing printing by the heat transfer method, recording sheets should have wax receptivity, and usually specially designed paper sheets are used.

Attempts have been made to perform recording on a transparent recording sheet by a printer of the heat transfer method and use the recorded sheet in an overhead projector, and there has been an increasing demand for sheets suitable for it. The use of a plastic film, mainly a polyester film, a polyamide film or a polycarbonate film has been studied for use as such a transparent recording sheet because of its transparency, thermal stability and mechanical strength. But such plastic films have the defect of being insufficiently receptive to heat-meltable inks composed mainly of a wax, and this defect gives rise to various problems in heat transfer. When the adhesion of the heat-meltable ink to the plastic film is insufficient, the molten ink layer is not transferred to the recording sheet in exact correspondence to the signal (the so-called dot missing phenomenon), and the dot missing phenomenon is liable to occur particularly in the terminal parts and fine line parts of the recording signal.

Color printers of the heat transfer type are also prevailing. In practicing color recording by using them, four kinds at a maximum of heat-meltable ink must be transferred to the same place. If the ink receptivity of the recording sheet is not sufficient, the dot missing phenomenon occurs not only in low-density recorded portions but also high-density recorded portions such as solid prints.

The recording density in the heat transfer method is generally 3 to 16 dots/mm. If the dots are not transferred in exact correspondence to the recording signal at a density of such a small order, the quality of the printed image is reduced owing to the dot missing phenomenon.

If the adhesion of the ink to the recording sheet is insufficient, the durability of the resulting image is reduced. For example, when sheets obtained by heat transfer are used in an overhead projector, contacting of the sheets with each other or scratching of the sheets by another body frequently occurs. If the durabilty of the ink is low, the ink is peeled from the sheets at such a time, and the image is markedly impaired.

Japanese Laid-Open Patent Publications Nos. 135791/1986 and 143184/1986 laid-open on June 23, 1986 and June 30, 1986, respectively, which are after the Convention priority date of the present application make the following proposals.

Japanese Laid-Open Patent Publication No. 135791/1986 discloses a heat-sensitive transfer recording sheet comprising a film, a layer for receiving a heat-meltable ink formed on one surface of the film, and a slippery antistatic layer formed on the other surface. The Publication specifically describes polyethylene, polyvinyl chloride, polystyrene, polyvinyl butyral, polyacrylates, polyamides, polyesters and polyvinyl alcohol as a resin forming the ink receiving layer.

Japanese Laid-Open Patent Publication No. 143184/1986 discloses a heat-sensitive transfer recording medium composed of a receiving sheet at least having a polycationic polymeric electrolyte on its surface and a heat-sensitive transfer sheet having a transfer layer containing a direct dye and/or an acid dye. The Publication describes that the dye used in the recording medium is thermally sublimable.

It is an object of this invention to provide a heat transfer recording sheet having a film of a particular acrylic resin on at least one surface thereof.

Another object of this invention is to provide a heat transfer recording sheet which has a high adhesion strength with respect to a heat-meltable ink and therefore gives an image of good quality free from missing of heat transferred recorded dots.

Still another object of this invention is to provide a heat transfer recording sheet which gives an image having excellent durability.

Yet another object of this invention is to provide a heat transfer recording sheet having excellent antistatic property and slipperiness.

Further objects of this invention along with its advantages will become apparent from the following description.

These objects and advantages are achieved in accordance with this invention by a heat transfer recording sheet comprising (A) a substrate film, and (B) formed on at least one surface of the substrate film, a film of an acrylic resin having recurring units represented by the following formula (1)

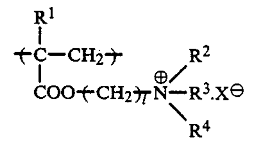

(1)

wherein $R^1$ represents a hydrogen atom or a methyl group, $R^2$ represents a hydrogen atom or an alkyl group having 1 to 5 carbon atoms, $R^3$ and $R^4$ are identical or different and each represents an alkyl or hydroxyalkyl group having 1 to 5 carbon atoms, X represents a halogen atom, and l is 2, 3 or 4.

The substrate film (A) used in this invention is made of, for example, a thermoplastic resin and may be transparent, semi-transparent or non-transparent. Preferably, the substrate film (A) is a transparent or semi-transparent thermoplastic resin film. For use in overhead projectors, films having high transparency are preferred. Examples of the thermoplastic resin are aromatic polyesters, polyamides, cellulose acetate, aromatic polycarbonates and polyvinyl chloride. The aromatic polyesters include, for example, polyethylene terephthalate, polyethylene naphthalate and poly(1,4-cyclohexanedimethylene terephthalate). One example of the aromatic polycarbonates is bisphenol A polycarbonate.

Of these, aromatic polyesters, particularly polyethylene terephthalate, are preferred as a material for the substrate film (A).

The suitable thickness of the substrate film (A) is usually 25 to 200 micrometers, preferably 40 to 150 micrometers. If it is too small, the recording sheet has insufficient rigidity and is difficult to insert into a printer. If it is too large, the recording sheet is difficult to handle and its price increases.

The adhesion of the film (B) or (C) to the substrate film (A) may be increased by subjecting the substrate film to a pre-treatment, for example the application of a corona discharge, a plasma or a primer before the film (B) or (C) is formed on it.

The recording sheet of this invention has a film of an acrylic resin having the recurring units represented by formula (1) above on one or both surfaces of the substrate film.

Preferably, the acrylic resin contains at least 20 mole % of the recurring units of formula (1).

In formula (1), $R^1$ is a hydrogen atom or a methyl group. $R^2$ is a hydrogen or an alkyl group having 1 to 5 carbon atoms such as methyl, ethyl, propyl or butyl. $R^3$ and $R^4$ are identical or different and each represents an alkyl group having 1 to 5 carbon atoms such as methyl, ethyl, propyl or butyl, or a hydroxyalkyl group having 1 to 5 carbon atoms such as hydroxyethyl, hydroxypropyl, hydroxybutyl or hydroxypentyl. X is a halogen atom such as chlorine or bromine. 1 is 2, 3 or 4.

Examples of the recurring units of formula (1) are

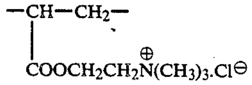
(1)-1

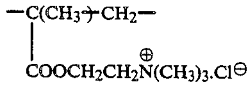
(1)-2

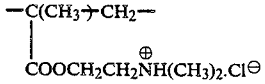
(1)-3

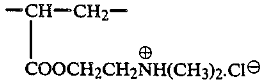
(1)-4

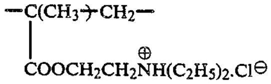
(1)-5

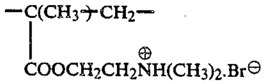
(1)-6

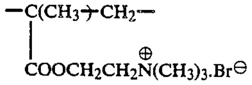
(1)-7

-continued

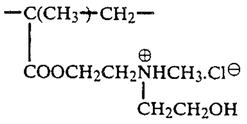
(1)-8

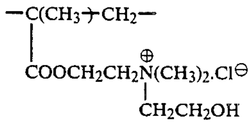
(1)-9

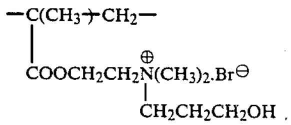
(1)-10

The recurring units of formula (1) can be formed by polymerizing a monomer represented by the following formula (1)'

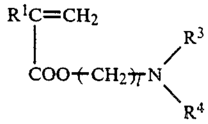
(1)' wherein $R^l$, $R^3$, $R^4$ and $l$ are as defined with regard to formula (1), together with a second monomer in the presence of a radical catalyst such as a peroxide (e.g., benzoyl peroxide) or an aliphatic azonitrile (e.g., azobisisobutyronitrile) and then quaternizing the product with a compound $R^2X$ wherein $R^2$ is as defined above.

The monomer of formula (1)' can be produced, for example, by reacting the corresponding lower alkyl (meth)acrylate with the corresponding N,N-di-$C_{1-2}$ alkyl omega-hydroxyalkylamine.

Acrylic copolymers composed mainly of the recurring units of formula (1) above and recurring units of the following formula (2)

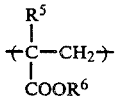
(2)

wherein $R^5$ represents a hydrogen atom or a methyl group, and $R^6$ represents a hydrogen atom, or a methyl, ethyl or hydroxyethyl group, as recurring units from the second monomer are especially preferably used as the acrylic resin. More preferred acrylic copolymers consist of 20 to 95 mole % of the recurring units of formula (1) and 80 to 5 mole % of the recurring units of formula (2).

The recurring units of formula (2) can be formed by polymerizing a monomer represented by the following formula (2)'

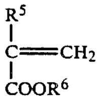
(2)' wherein $R^5$ and $R^6$ are as defined above.

Examples of the monomer of formula (2)' are (meth)acrylic acid, methyl (meth)acrylate, ethyl (meth)acrylate and hydroxyethyl (meth)acrylate.

The acrylic resin has a weight average molecular weight of, for example, 5,000 to 150,000, preferably 10,000 to 100,000. If its molecular weight is too low, the film-forming ability of the acrylic resin is poor and the resulting film tends to show reduced antiblocking property. On the other hand, if the molecular weight is too high, a coating liquid of the resulting resin is difficult to coat in the formation of the film (B), and the adhesion of the coated film to the substrate film tends to be reduced.

One commercially available acrylic resin within the above definition is Elecond PQ-50B (tradename) produced by Sohken Chemical Co., Ltd.

Preferably, the film of the acrylic resin has a dry thickness of 0.005 to 1 micrometer, especially 0.01 to 0.1 micrometer. If the film is too thin, the adhesion of the heat-meltable ink to it tends to be insufficient, and dot missing tends to occur during heat transfer recording. If, on the other hand, it is too thick, the resulting sheet has marked tackiness at a high humidity. Such sheets tend to undergo jamming during recording on a printer or blocking during storage.

Ordinary coating procedures such as gravure coating, bar coating, reverse roll coating or knife coating can be used to form a film of the acrylic resin on the substrate film.

The film may contain other resins, lubricants, coloring agents, etc. in amounts which do not degrade its properties.

Formation of the acrylic resin film on a recording surface of a recording sheet suffices for heat transfer recording. To impart sufficient antistatic property or slipperiness to the recoding sheet of this invention, a film capable of imparting such a property is formed on the other surface of the substrate film.

Thus, according to another aspect of this invention, there is provided a recording sheet comprising the substrate film (A), the acrylic resin film (B) on one surface of the substrate film, and (C) a film having antistatic property on the other surface of the substrate film.

The film (C) may be formed from a material selected from the same acrylic resins as defined above with regard to the film (B), or may be composed of a mixture of an imidazoline compound, a polyoxyethylene alkyl phenyl ether and a fatty acid metal salt.

A preferred example of the imidazoline compound is a compound represented by the following formula (3)

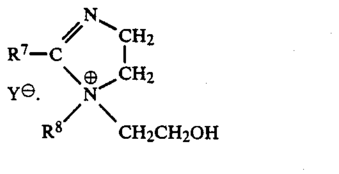

(3)

wherein $R^7$ represents an alkyl or alkenyl group having 10 to 24 carbon atoms, $R^8$ represents an alkyl group having 1 to 4 carbon atoms, and Y represents one equivalent of an anion.

The $C_{10}$–$C_{24}$ alkyl or alkenyl group for $R^7$ may be linear or branched. Stearyl and oleyl groups ($C_{17}$), particularly the latter, are preferred as $R^7$.

$R^8$ is an alkyl group having 1 to 4 carbon atoms such as methyl, ethyl, n-propyl, iso-propyl, n-butyl, sec-butyl, iso-butyl or t-butyl.

Y is one equivalent of an anion, for example a halogen anion such as a chlorine or bromine anion, $CH_3SO_4^-$, $C_2H_5SO_4^-$, a di($C_1$–$C_6$ alkyl) phosphate anion such as a dibutyl phosphate anion, and $\frac{1}{2}SO_4^{2-}$.

Preferred examples of the compound of formula (3) are compounds of formulae (3)-1 and (3)-2 below.

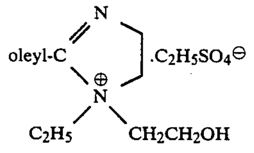

(3)-1

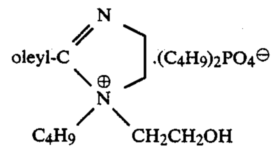

(3)-2

The compound of formula (3) can be obtained by quaternizing the corresponding non-quaternary imidazoline compound by methods known per se. The degree of quaternization is expressed as the degree of cationization. The compound of formula (3) used has a degree of cationizaion of at least 50%. Preferred examples of the polyoxyethylene alkyl phenyl ether are compounds of the following formula (4)

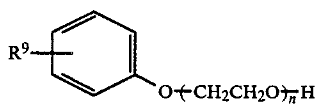

(4)

wherein $R^9$ represents an alkyl group having 8 to 10 carbon atoms, and n is a number of 8 to 10. Octylphenoxypolyoxyethylene glycol and nonylphenoxypolyoxyethylene glycol, for example, are preferred as the compound of formula (4). The compounds of formula (4) have an HLB (hydrophile-lipophile balance) of 6 to 12.

Preferred examples of the fatty acid metal salt are alkali metal salts of aliphatic monocarboxylic acids having 1 to 3 carbon atoms, such as a sodium or potassium salt of formic acid, acetic acid or propionic acid.

Preferably, the mixture forming the film (C) consists of 85 to 40% by weight of the imidazoline compound, 13 to 40% by weight of the polyoxyethylene alkyl phenyl ether and 2 to 20% by weight of the fatty acid metal salt.

If one of the imidazoline compound and the fatty acid metal salt is lacking, the antistatic property of the resulting film (C) is insufficient. Furthermore, when the mixture lacks the imidazoline compound, the slipperiness of the film (C) at a high temperature and humidity is rapidly reduced, and the tackiness of the film surface increases. This may lead to a conveyance trouble such as jamming. If the mixture lacks the fatty acid metal salt, the antistatic property of the resulting film (C) is drastically reduced at a high temperature and a low humidity, and the durability of the film also decreases.

On the other hand, if the mixture lacks the polyoxyethylene alkyl phenyl ether, it is difficult to coat a coating liquid of the resulting mixture uniformly on the surface of the substrate film, and the resulting coated film has reduced durability.

Desirably, the film (C) has a thickness corresponding to a weight of 0.002 to 0.5 $g/m^2$ of film surface, preferably 0.004 to 0.1 $g/m^2$ of film surface. If the film (C) is too thin, the antistatic effect and slipperiness of the film are reduced. If it is too thick, the tackiness of the sheet increases and tends to cause a conveyance trouble during recording on a printer or a trouble during storage of the resulting recording sheets, such as blocking.

The film (C) can be formed by a method similar to the method of forming the film (B).

The film (C) may contain other resins, lubricants, coloring agents, etc. in amounts which do not impair its properties.

The resulting recording sheet is useful for recording on a printer of the heat transfer type and has a high adhesion strength with respect to a heat-meltable ink at a temperature and a humidity within broad ranges. It gives an image of high quality without dot missing at the time of ink transfer. At the time of recording, it has excellent conveyability and no jamming occurs.

The following examples illustrate the present invention more specifically.

A heat-sensitive transfer material used in evaluating the recording sheets in the following examples was produced as follows:

A transfer ink layer composed of the following ingredients

| | |
|---|---|
| carnauba wax | 40 parts by weight |
| paraffin wax | 30 parts by weight |
| pigment | 17 parts by weight |
| polytetrahydrofuran | 10 parts by weight |
| silicone oil | 3 parts by weight |

was coated by a hot roll on one surface of a biaxially stretched polyethylene terephthalate film having a thickness of 6 micrometers by a hot-melt coating technique so that the thickness of the layer became 5 micrometers. There was obtained a color heat-sensitive transfer material having four colors, cyan, magenta, yellow and black.

In the examples, the scratch test was carried out by rubbing a black portion (superimposition of yellow, magenta and cyan) of a printed sample ten times under a load of 200 g with a stainless steel rod having a hemispherical end portion with an R of 1.0 m/m, and examining the peeled state of the ink.

EXAMPLES 1-3 AND COMPARATIVE EXAMPLE 1

In each run, a 50% by weight solution of a quaternary ammonium salt-containing acrylic copolymer (weight average molecular weight 40,000; Elecond PQ-50B manufactured by Sohken Chemical Co., Ltd.) was diluted with a mixed solvent composed of isopropanol and water in a ratio of 80:20, and coated by a bar coater on one surface of a polyethylene terephthalate film having a thickness of 75 micrometers so that the amount of the coating as solids was as shown in Table 1.

A model symbol was printed on the resulting recording sheet at a recording density of 8 dots/mm on a heat transfer color printer, and the state of transfer of the ink to the recording sheet was examined. Furthermore, the printed sheet was subjected to the scratch test to examine the durability of the image.

The results are shown in Table 1.

TABLE 1

| Run | Amount coated ($g/m^2$) | Transfer-ability | Durability of the image |
|---|---|---|---|
| Comparative Example 1 | 0 | Poor | Poor |
| Example 1 | 0.01 | Good | Very good |
| Example 2 | 0.04 | Very good | Very good |
| Example 3 | 0.1 | Very good | Very good |

In Tables 1 to 5, the "transferability" and the "durability of the image" were evaluated on the following scales.

Transferability

Poor: Dot missing occurred not only in a low-density recorded portion but also in a high-density recorded position.

Good: Slight dot missing occurred in the low-density recorded portion.

Very good: No dot missing.

Durability of the image

Poor: The ink layer was easily peeled.

Very good: The ink layer was not peeled.

EXAMPLES 4-8 AND COMPARATIVE EXAMPLES 2-4

In each run, a 50% by weight solution of a quaternary ammonium salt-containing acrylic copolymer (weight average molecular weight 40,000; Elecond PQ-50B manufactured by Sohken Chemical Co., Ltd.) was diluted with a mixed solvent composed of isopropanol and water in a ratio of 80:20, and coated by a bar coater on one surface of a polyethylene terephthalate film having a thickness of 75 micrometers so that the amount of the coating as solids was as shown in Table 2.

A 1.5% by weight aqueous solution of a mixture (antistatic agent) composed of oleyl imidazoline ethosulfate having a degree of cationization of 72% represented by formula (3)-1 given hereinabove, polyoxyethylene octyl phenyl ether having an HLB of 8 and sodium propionate in a weight ratio of 66:27:7 was diluted with a mixed solvent composed of isopropanol and water in a weight ratio of 70:30, and coated on the other surface of the polyethylene terephthalate film so that the amount of the coating as solids was as shown in Table 2.

A model symbol was printed on the resulting recording sheet at a recording density of 8 dots/mm on a heat transfer color printer in an atmosphere kept at 35° C. and 90% RH, and an atmosphere kept at 10° C. and 20% RH, respectively. The state of transfer of the ink to the recording sheet was examined. The results are shown in Table 2.

TABLE 2

| Example (Ex.) or Comparative Example (CEx.) | Amount of coating (g/m²) | | 35° C. × 90% RH | | 10° C. × 20% RH | |
|---|---|---|---|---|---|---|
| | Elecond PQ-50B | Anti-static agent | Convey-ability (*) | Transfer-ability | Convey-ability (*) | Transfer-ability |
| Ex. 4 | 0.01 | 0.04 | 0/100 | Good | 0/100 | Good |
| Ex. 5 | 0.04 | 0.01 | 0/100 | Very good | 0/100 | Very good |
| Ex. 6 | 0.04 | 0.04 | 0/100 | Very good | 0/100 | Very good |
| Ex. 7 | 0.04 | 0.10 | 0/100 | Very good | 0/100 | Very good |
| Ex. 8 | 0.10 | 0.04 | 0/100 | Very good | 0/100 | Very good |
| CEx. 2 | 0 | 0 | 30/100 | Poor | 80/100 | Poor |
| CEx. 3 | 0 | 0.04 | 0/100 | Poor | 0/100 | Poor |
| CEx. 4 | 0 | 2.0 | 100/100 | Printing impossible | 100/100 | Printing impossible |

(*) The conveyability is expressed by the number of jamming occurrence in 100 printing operations.

EXAMPLES 9–13

In each run, a recording sheet was prepared in the same way as in Examples 4 to 8 except that oleylimidazoline dibutyl phosphate having a degree of cationization of 70% was used instead of the oleyl imidazoline ethosulfate.

A model symbol was printed on the resulting recording sheet at a recording density of 8 dots/mm on a heat transfer color printer in an atmosphere kept at 35° C. and 90% RH, and an atmosphere kept at 10° C. and 20% RH, respectively. The state of transfer of the ink to the recording sheet was examined. The results are shown in Table 3.

TABLE 3

| Example | Amount of coating (g/m²) Elecond PQ-50B | Anti-static agent | 35° C. × 90% RH Conveyability (*) | Transferability | 10° C. × 20% RH Conveyability (*) | Transferability |
|---|---|---|---|---|---|---|
| 9 | 0.01 | 0.04 | 0/100 | Good | 0/100 | Good |
| 10 | 0.04 | 0.01 | 0/100 | Very good | 0/100 | Very good |
| 11 | 0.04 | 0.04 | 0/100 | Very good | 0/100 | Very good |
| 12 | 0.04 | 0.10 | 0/100 | Very good | 0/100 | Very good |
| 13 | 0.10 | 0.04 | 0/100 | Very good | 0/100 | Very good |

(*) Same as the footnote to Table 2.

EXAMPLES 14–17

In each run, a 50% by weight solution of a quaternary ammonium salt-containing acrylic copolymer (weight average molecular weight 40,000; Elecond PQ-50B manufactured by Sohken Chemical Co., Ltd.) was diluted with a mixed solvent composed of isopropanol and water in a ratio of 80:20, and coated by a bar coater on one surface of a polyethylene terephthalate film having a thickness of 75 micrometers so taht the amount of the coating as solids was as shown in Table 4.

A model symbol was printed on the resulting recording shéet at a recording density of 8 dots/mm on a heat transfer color printer in an atmosphere kept at 35° C. and 90% RH, and an atmosphere kept at 10° C. and 20% RH, respectively. The state of transfer of the ink to the recording sheet was examined. The results are shown in Table 4.

TABLE 4

| Example | Amount of Elecond PQ-50B coated (g/m²) Printing surface | Travelling surface | 35° C. × 90% RH Conveyability (*) | Transferability | 10° C. × 20% RH Conveyability (*) | Transferability |
|---|---|---|---|---|---|---|
| 14 | 0.01 | 0.02 | 0/100 | Good | 0/100 | Good |
| 15 | 0.04 | 0.02 | 0/100 | Very good | 0/100 | Very good |
| 16 | 0.04 | 0.04 | 0/100 | Very good | 0/100 | Very good |
| 17 | 0.10 | 0.04 | 0/100 | Very good | 0/100 | Very good |

(*) Same as the footnote to Table 2.

EXAMPLES 18–22

Quaternary ammonium salt-containing acrylic copolymers composed of recurring units of the following formula (1)-2 and recurring units of the following formula (2)-1

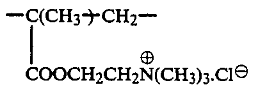
(1)-2

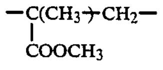
(2)-1 in the ratios shown in Table 5 and having the molecular weights shown in Table 5 were used. A 50% solution of each of these acrylic copolymers was diluted with a mixed solvent composed of isopropanol and water in a weight ratio of 80:20, and coated by a bar coater on both surfaces of a polyethylene terephthalate film having a thickness of 75 micrometers so that the amount of the coating as solids was 0.04 g/m².

A 1.5% by weight aqueous solution of a mixture (antistatic agent) composed of oleyl imidazoline ethosulfate having a degree of cationization of 72% represented by formula (3)-1 given hereinabove, polyoxyethylene octyl phenyl ether having an HLB of 8 and sodium propionate in a weight ratio of 66:27:7 was diluted with a mixed sovlent composed of isopropanol and water in a weight ratio of 70:30, and coated on the other surface of the polyethylene terephthalate film so at the amount of the coating as solids was 0.03 $g/m^2$.

A model symbol was printed on the resulting recording sheet at a recording density of 8 dots/mm on a heat transfer color printer in an atmosphere kept at 35° C. and 90% RH, and an atmosphere kept at 10° C. and 20% RH, respectively. The state of transfer of the ink to the recording sheet was examined. The results are shown in Table 5.

$l$ is 2, 3, or 4, and, recurring units of the following formula (2)

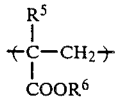

(2)

wherein $R^5$ represents a hydrogen atom or a methyl group, and $R^6$ represents a hydrogen atom or a methyl, ethyl or hydroxyethyl group.

2. The recording sheet of claim 1 wherein the substrate film (A) is a transparent or semi-transparent film of a thermoplastic resin.

TABLE 5

| | Quaternary ammonium salt-containing acrylic copolymer | | | | | |
|---|---|---|---|---|---|---|
| | Ratio of | Weight average | 35° C. × 90% RH | | 10° C. × 20% RH | |
| Example | (1)-2/(2)-1 | molecular weight | Conveyability (*) | Transferability | Conveyability (*) | Transferability |
| 18 | 40/60 | 40,000 | 0/100 | Very good | 0/100 | Very good |
| 19 | 60/40 | 40,000 | 0/100 | Very good | 0/100 | Very good |
| 20 | 80/20 | 40,000 | 0/100 | Very good | 0/100 | Very good |
| 21 | 60/40 | 20,000 | 0/100 | Very good | 0/100 | Very good |
| 22 | 60/40 | 60,000 | 0/100 | Very good | 0/100 | Very good |

(*) Same as the footnote to Table 2.

It is seen from Table 1 that the adhesion of the heat-meltable ink was greatly improved by the formation of the film of the quaternary ammonium salt-containing acrylic copolymer.

Tables 2, 3, and 5 show that the adhesion of the heat-meltable ink and the conveyability of the recording sheet during recording were markedly improved over wide temperature and humidity ranges by forming the film of the quaternary ammonium salt-containing acrylic copolymer and the film of the specific antistatic agent composed of the imidazole compound, the polyoxyethylene alkyl phenyl ether and the fatty acid metal salt.

Table 4 shows that the adhesion of the heat-meltable ink and the conveyability of the recording sheet during recording were markedly improved over broad temperature and humidity ranges by forming the film of the quaternary ammonium salt-containing acrylic copolymer on both surfaces of the polyester film.

What we claim is:

1. A heat transfer recording sheet comprising
(A) a substrate film, and
(B) formed on at least one surface of the substrate film, a film of an acrylic copolymer composed mainly of the recurring units of formula (1)

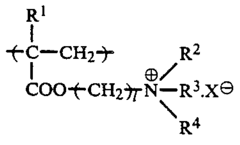

(1)

wherein
$R^1$ represents a hydrogen atom or a methyl group.
$R^2$ represents a hydrogen atom or an alkyl group having 1 to 5 carbon atoms,
$R^3$ and $R^4$ are identical or different and each represents an alkyl or hydroxyalkyl group having 1 to 5 carbon atoms,
X represents a halogen atom, and 3. The recording sheet of claim 1 wherein the substrate film (A) is prepared from an aromatic polyester, a polyamide, cellulose acetate, an aromatic polycarbonate or polyvinyl chloride.

4. The recording sheet of claim 1 wherein the substrate film (A) has a thickness of 25 to 200 micrometers.

5. The recording sheet of claim 1 wherein the acrylic copolymer of the film (B) is an acrylic copolymer containing at least 20 mole % of the recurring units of formula (1).

6. The recording sheet of claim 1 wherein the acrylic copolymer of the film (B) has a weight average molecular weight of 5,000 to 150,000.

7. The recording sheet of claim 1 wherein the film (B) has a thickness of 0.005 to 1 micrometer.

8. A heat transfer recording sheet comprising
(A) a substrate film,
(B) formed on one surface of the substrate film, a film of an acrylic copolymer resin having recurring units represented by the following formula (1)

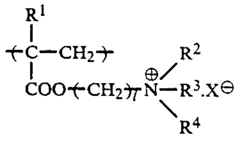

(1)

wherein
$R^1$ represents a hydrogen atom or a methyl group.
represents a hydrogen atom or an alkyl group having 1 to 5 carbon atoms,
$R^3$ and $R^4$ are identical or different and each represents an alkyl or hydroxyalkyl group having 1 to 5 carbon atoms,
X represents a halogen atom, and
$l$ is 2, 3, or 4, and, recurring units of the following formula (2)

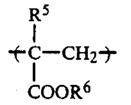

(2)

wherein $R^5$ represents a hydrogen atom or a methyl group, and $R^6$ represents a hydrogen atom or a methyl, ehtyl or hydroxyethyl group, and, (C) formed on the other surface of the substrate film, a film having antistatic property.

9. The recording sheet of claim 8 wherein the film (C) is prepared from a material selected from the same acrylic resins as defined above with regard to the film (B).

10. The recording sheet of claim 8 wherein the film (C) is prepared from a mixture of an imidazoline compound, a polyoxyethylene alkyl phenyl ether and a fatty acid metal salt.

11. The recording sheet of claim 10 wherein the imidazoline compound is represented by the following formula (3)

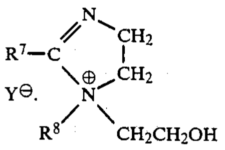

(3)

wherein $R^7$ reprsents an alkyl or alkenyl group having 10 to 24 carbon atoms, represents an alkyl group having 1 to 4 carbon atoms, and Y represents one equivalent of an anion.

12. The recording sheet of claim 10 wherein the polyoxyethylene alkyl phenyl ether is represented by the following formula (4)

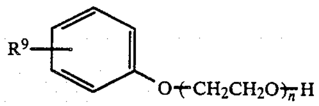

(4)

wherein $R^9$ represents an alkyl group having 8 to 10 carbon atoms, and n is a number of 8 to 10.

13. The recording sheet of claim 10 wherein the fatty acid metal salt is an alkali metal salt of an aliphatic monocarboxylic acid having 1 to 3 carbon atoms.

14. The recording sheet of claim 10 wherein the mixture is composed of 85 to 40% by weight of the imidazoline compound, 13 to 40% by weight of the polyoxyethylene alkyl phenyl ether and 2 to 20% by weight of the fatty acid metal salt.

15. The recording sheet of claim 8 wherein the film (C) has a thickness corresponding to a weight of 0.002 to 0.5 g/m² of film surface.

* * * * *

UNITED STATES PATENT AND TRADEMARK OFFICE
CERTIFICATE OF CORRECTION

PATENT NO. : 4,784,896

DATED : November 15, 1988

INVENTOR(S) : TERUO MATSUNAGA, ET AL.

It is certified that error appears in the above-identified patent and that said Letters Patent is hereby corrected as shown below:

IN THE CLAIMS

Column 12, claim 8, line 61, before "represents", insert --$R^2$--.

Column 13, claim 8, line 13, delete "ehtyl", insert --ethyl--.

Column 14, claim 11, line 10, after "atoms,", insert --$R^8$--.

Signed and Sealed this

Twenty-first Day of March, 1989

*Attest:*

DONALD J. QUIGG

*Attesting Officer*

*Commissioner of Patents and Trademarks*